United States Patent [19]

Yamauchi et al.

[11] Patent Number: 5,395,089
[45] Date of Patent: Mar. 7, 1995

[54] SEAT WITH SUSPENSION UNIT FOR AUTOMOTIVE VEHICLE

[75] Inventors: Yoshihiko Yamauchi; Naoki Sugihara, both of Ayase, Japan

[73] Assignee: Ikeda Bussan Co., Ltd., Ayase, Japan

[21] Appl. No.: 46,726

[22] Filed: Apr. 16, 1993

[30] Foreign Application Priority Data

Apr. 23, 1992 [JP] Japan .................. 4-033998 U
Apr. 23, 1992 [JP] Japan .................. 3-033999 U

[51] Int. Cl.[6] .................. F16M 13/06; B60N 2/00
[52] U.S. Cl. .................. 248/585; 297/308; 248/578
[58] Field of Search .............. 297/344.16, 307, 296, 297/308, 329, 344.13, 344.14; 248/635, 585, 584, 578, 591

[56] References Cited

U.S. PATENT DOCUMENTS

| | | | |
|---|---|---|---|
| 2,470,907 | 5/1949 | White et al. | 248/564 |
| 2,534,047 | 12/1950 | McIntyre | 248/578 X |
| 2,540,525 | 2/1951 | Howarth | 248/578 |
| 2,562,041 | 7/1951 | Keller | 297/307 |
| 2,598,421 | 5/1952 | Page | 297/308 |
| 2,606,592 | 8/1952 | McIntyre et al. | 248/564 |
| 2,636,544 | 4/1953 | Hickman | 297/308 X |
| 2,680,472 | 6/1954 | Hempe, Jr. | 155/9 |
| 2,991,970 | 7/1961 | White et al. | 248/377 |
| 3,022,975 | 2/1962 | Horton | 297/344.13 X |
| 3,405,901 | 10/1968 | Gregoire | 248/585 X |
| 3,519,241 | 7/1970 | Tschursch | 248/584 X |
| 3,572,828 | 3/1971 | Lehner | 297/307 |
| 3,897,036 | 7/1975 | Nystrom | 248/585 X |
| 4,181,353 | 1/1980 | Grass et al. | 297/307 |
| 4,363,594 | 10/1982 | Lowe | 297/307 |
| 4,662,597 | 5/1987 | Uecker et al. | 248/564 |
| 4,702,454 | 10/1987 | Izumida | 248/585 |
| 4,838,514 | 6/1989 | Hill | 248/577 |
| 5,116,016 | 5/1992 | Nagata | 248/578 |

FOREIGN PATENT DOCUMENTS

| | | | |
|---|---|---|---|
| 0268900 | 2/1969 | Austria | 297/345 |
| 515035 | 7/1955 | Canada | 248/584 |
| 31092 | 12/1960 | Finland | 297/344.14 |
| 1083091 | 6/1954 | France | 248/585 |
| 3031175 | 3/1981 | Germany | 297/344 |
| 57-20242 | 2/1982 | Japan . | |
| 248293 | 3/1926 | United Kingdom | 248/635 |
| 0308892 | 9/1971 | U.S.S.R. | 248/564 |

*Primary Examiner*—Kenneth J. Dorner
*Assistant Examiner*—David E. Allred
*Attorney, Agent, or Firm*—Foley & Lardner

[57] ABSTRACT

A suspension seat for an automotive vehicle has a seat frame which is vertically movably supported on a parallel link mechanism. A compression spring and a shock absorber of a suspension unit are coaxially assembled. A spring bracket is disposed on the compression spring and screwed with a rod of the shock absorber. A fixing nut is fixed to the rod on the spring bracket to adjust elastic force of the compression spring by changing the position of the spring bracket. A projection of the spring bracket projects from a slit of a suspension unit support bracket with scale division. A resilient bracket supports the parallel link mechanism and outwardly projects to function as a bumper for a seat frame. Therefore, the suspension seat suppresses shock or sound due to impact during an operation of the seat and realizes a simple adjustment of hardness of the suspension unit.

5 Claims, 9 Drawing Sheets

SEAT WITH SUSPENSION UNIT FOR AUTOMOTIVE VEHICLE

BACKGROUND OF THE INVENTION

1. Field of the Invention

The present invention relates to improvements in a vehicular seat, and more particularly to a seat with a suspension unit in which a seat frame is supported by the suspension unit for absorbing vibrations and impacts applied thereto.

2. Description of the Prior Art

A variety of seats with suspension units (suspension seats) have been proposed and put into practical use. A typical suspension seat is arranged such that a seat frame is elastically supported by a parallel link mechanism and a suspension unit which are disposed between a seat cushion and a floor of an automotive vehicle. Additionally, at least a pair of extension springs are connected to the parallel link mechanism for applying upward biasing force to the suspension seat. In order to simplify the structure of the suspension seat, Japanese Utility Model Provisional Publication No. 57-20242 discloses a suspension seat in which a compression spring and a shock absorber are coaxially assembled and support a seat frame.

However, such a suspension seat has still had a limitation of a suspension stroke due to the location of the suspension unit between a suspension seat and a floor. Furthermore, when the seat cushion portion of the suspension seat vertically moves for absorbing uncomfortable shock from the vehicle body, this suspension seat tends to generate striking sound due to the collision between the parts of the suspension seat or between the part and the floor. Additionally, this collision degrades the durability of the suspension seat.

SUMMARY OF THE INVENTION

It is an object of the present invention to provide a seat with a suspension unit (or suspension seat) which seat suppresses to generate striking sound between the parts of the suspension seat or between the part and a support of the suspension seat.

Another object of the present invention is to provide a suspension seat with a suspension unit which seat enables an easy adjustment of the hardness of the suspension unit according to a passenger's preference while keeping a simple structure and easy assembly steps.

It is a further object of the present invention to provide a seat with a suspension unit which seat improves the durability by suppressing the impact between the parts of the suspension seat or between the part and a support of the suspension seat.

It is a further object of the present invention to provide an improved suspension seat which provides a sufficient suspension stroke for absorbing impact force applied to the seat cushion, while suppressing the space between the suspension seat and a floor.

A first aspect of the present invention resides in an arrangement of a suspension seat for an automotive vehicle. The suspension seat comprises a seat frame and a parallel link mechanism. The parallel link mechanism supports the seat frame to be vertically movable above a vehicular floor and includes front and rear links. A suspension unit is connected to an upper bracket integral with the seat frame and the rear link. The suspension unit includes a compression spring and a shock absorber which are coaxially arranged so as to extend in the generally vertical direction. A bearing made of resilient material rotatably supports the supporting portion of the rear link on the vehicular floor.

A second aspect of the present invention reside in an arrangement of a suspension seat for an automotive vehicle. The suspension seat comprises a seat frame which has a seat back portion, a seat cushion portion, and an upper suspension bracket. A parallel link mechanism includes front and rear links and supports the seat frame to be vertically movable above a vehicular floor. A suspension unit is connected to the upper suspension bracket and the rear link. The suspension unit includes a compression spring, a spring bracket, a fixing nut, and a shock absorber which are coaxially assembled. The shock absorber has a rod whose upper portion forms a screw portion. The spring bracket receives the compression spring and is screwed by the screw portion. The fixing nut is fixed to the screw portion so as to change the biasing force of the compression spring by the rotation of the fixing nut. The upper suspension bracket has a slit from which a projection of the spring bracket projects so as to point at a position of a scale division formed on the upper suspension bracket.

BRIEF DESCRIPTION OF THE DRAWINGS

In the drawings, like reference numerals designate like parts and elements throughout all figures, in which.

DETAILED DESCRIPTION OF THE INVENTION

Referring now to FIGS. 1 to 7, there is shown a first embodiment of a seat with a suspension unit (or suspension seat) 1 according to the present invention.

Figure 1:
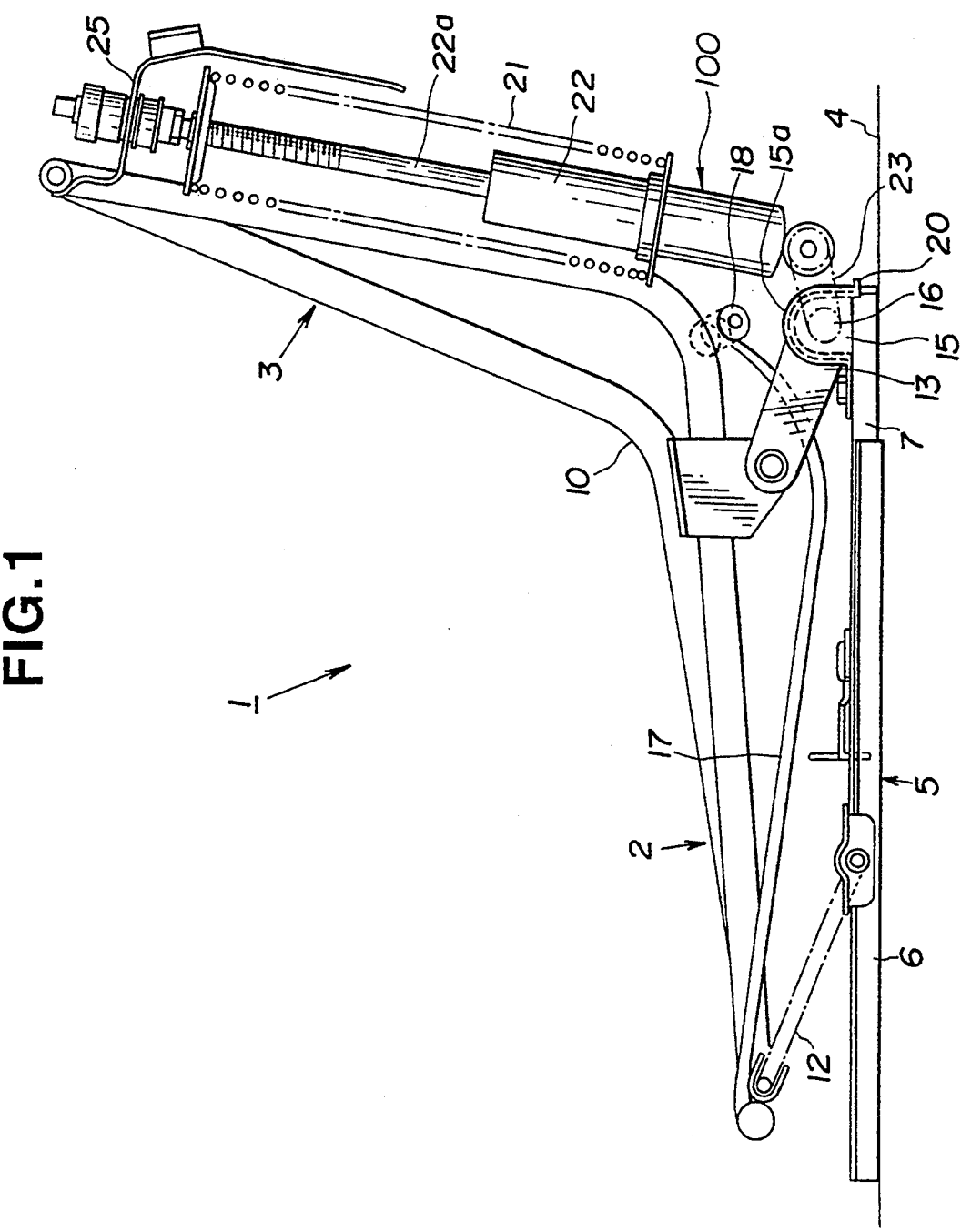
FIG. 1 is a side view showing a first embodiment of a seat with a suspension unit (suspension seat) according to the present invention.
Figure 2:
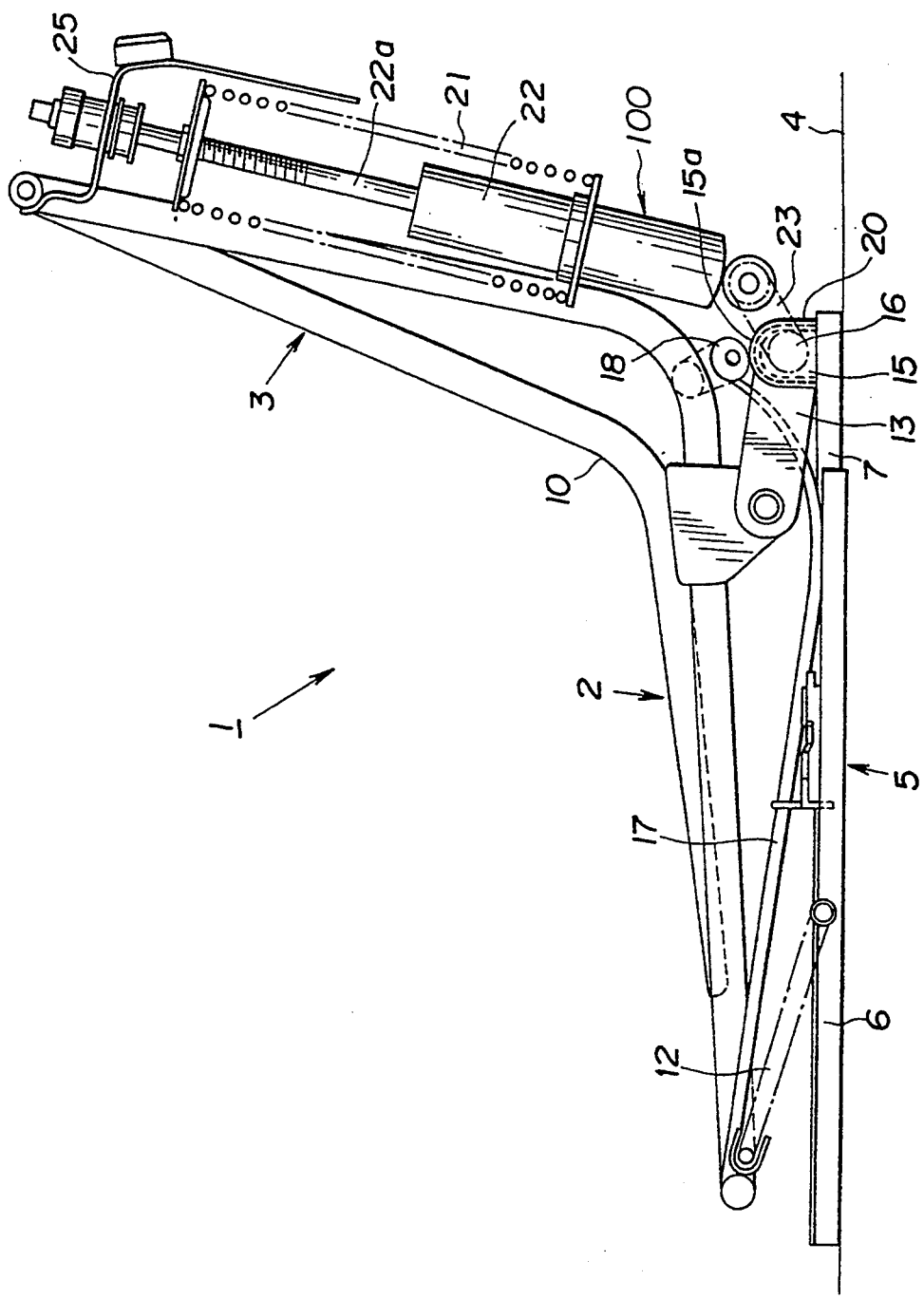
FIG. 2 is a side view showing the first embodiment of FIG. 1 which is under a condition that impact force is applied thereto.
Figure 3:
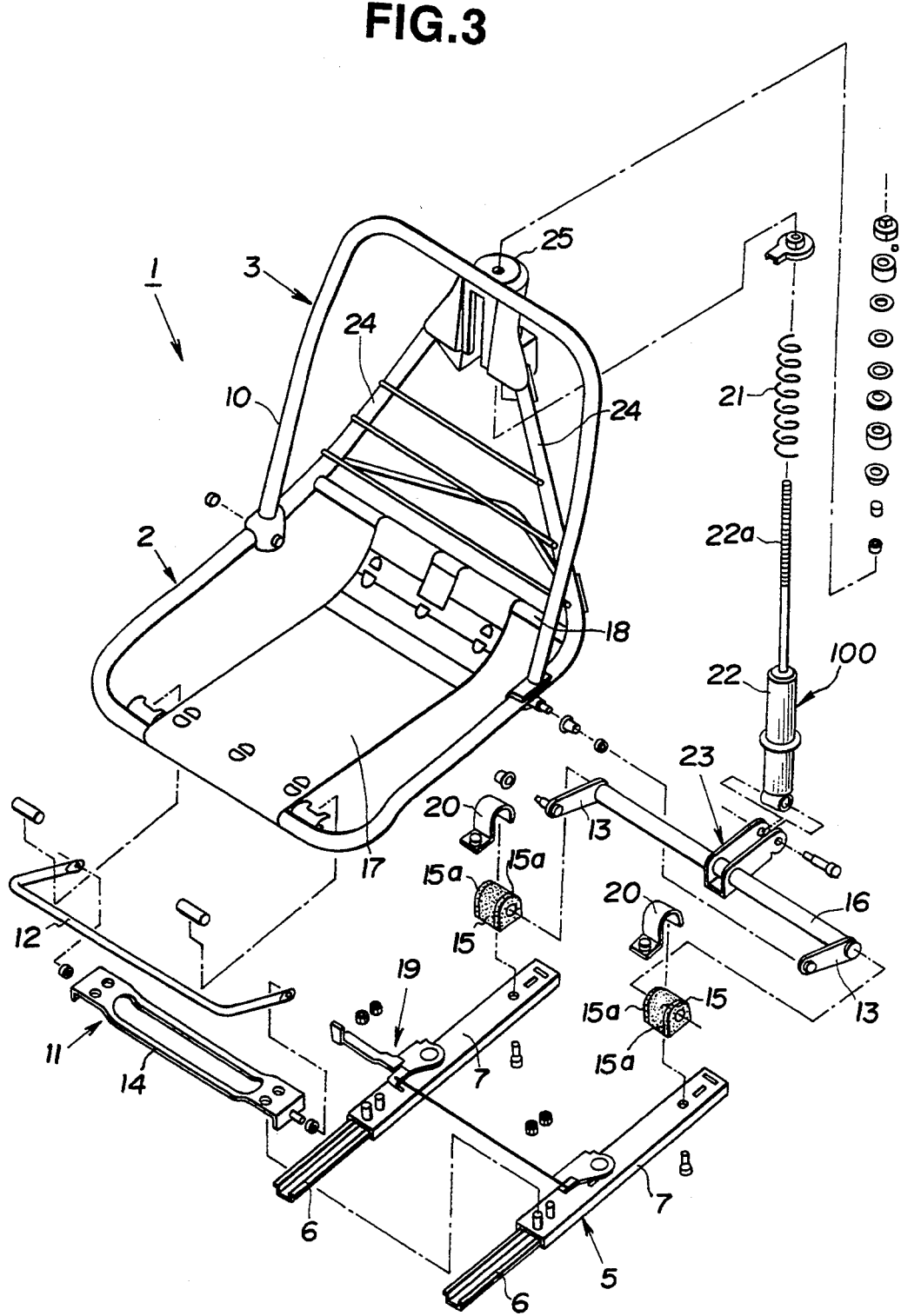
FIG. 3 is an exploded perspective view of the first embodiment of the suspension seat of FIG. 1.

The suspension seat 1 for a vehicle passenger comprises a seat frame 10 which includes a seat cushion portion 2 and a seat back portion 3. The seat frame 10 is provided with a seat cushion panel 17 for supporting a seat cushion (not shown) thereon, as shown in FIG. 3. The seat cushion panel 17 is connected to a front part of the seat cushion portion 2 and a seatback pipe-frame 18. The seat frame 10 is disposed above a vehicular floor 4 through a seat slide mechanism 5 which is arranged so as to allow the suspension seat 1 to be slidable in the front-and-aft direction. The seat slide mechanism 5 is provided with a pair of fixed rails 6 and a pair of sliding rails 7. The slide mechanism 5 further includes a slide lock 19 for locking the slide of the slide mechanism 5.

Figure 4:
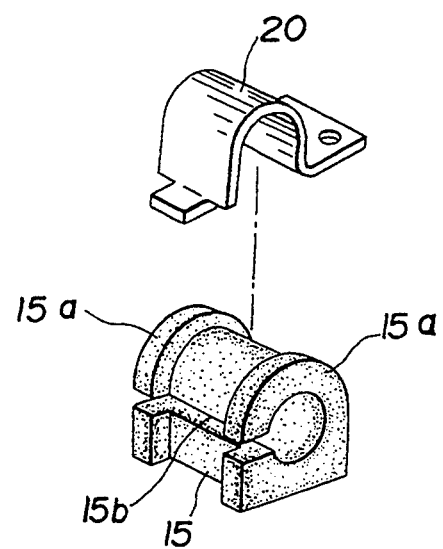
FIG. 4 is an exploded perspective view of a bearing and a bracket of the first embodiment according to the present invention.
Figure 5:
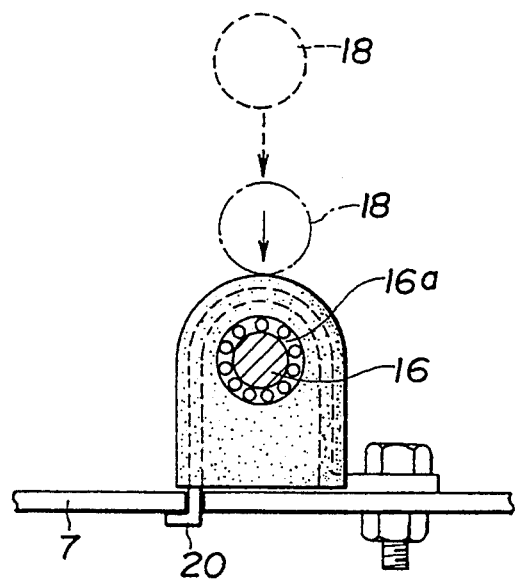
FIG. 5 is a side view of the beating and bracket of FIG. 4 under an assembled condition.

A parallel link mechanism 11 is installed between the seat slide mechanism 5 and the seat cushion portion 2 of the seat frame 10 so as to vertically movably support the seat cushion portion 2 on the slide mechanism 5. The parallel link mechanism 11 includes front and rear links 12 and 13, as shown in FIG. 3. A front support brackets 14 is connected to the front portions of the sliding rails 7. The front link 12 is generally U-shaped and is connected at its opposite end portions to the front link support bracket 14 so as to be pivotable around pivot portions of the front link support bracket 14. A generally intermediate portion of the front link 12 is rotatably supported to the front part of the seat cushion portion 2 of the seat frame 10. The rear link 13 is constituted by a pair of plate members and a supporting shaft 16 which are integrally connected with each other, as shown in FIG. 3. The rear link 13 is swingably supported at its supporting shaft 16 to a pair of rear link support bearings 15 and swingably supported at its upper portion to the rear part of the seat cushion portion 2 of the seat frame 10. The rear link support bearings 15 are made of resilient material and fixedly mounted on the sliding rails 7, respectively by brackets 20. As shown in FIGS. 4 and 5, each of the rear link support bearings 15 has flange portions 15a which outwardly project from both side ends of each rear link support bearing 15. The flange portions 15a function as a bumper portion which elastically supports the seatback pipe-frame 18 constituting a part of the seat cushion 2. Further, each of the rear link support bearings 15 has a slit 15b through which the supporting shaft 16 is installed to the rear link support bearings 15, as is clear from FIG. 4.

Although in FIG. 5 the supporting shaft 16 has been shown and described to be supported to the rear link support bearings 15 through bearings 16a, it will be understood that the supporting shaft 16 may be directly supported to the rear link support bearings 15.

A suspension unit 100 is provided with a compression spring 21 acting as a suspension spring and a shock absorber 22 for absorbing impact force caused by a radical vertical swing of the seat frame 10. The shock absorber 22 has a movable rod 22a to which the compression spring 21 is coaxially installed so as to always apply a biasing force upwardly to the seat frame 10, as shown in FIG. 3. The lower end portion of the shock absorber 22 is pivotally connected to the arm portion 23. The upper end portion of the movable rod 22a is connected to the upper end 25 of the suspension brackets 24.

As is clearly shown in FIG. 3, a pair of suspension brackets 24 are integrally connected to the seat frame 10. The suspension brackets 24 extend upwardly and are connected to an upper portion of the seatback frame 3 through an upper end 25 to which a top end portion of the movable rod 22a of the shock absorber 22 is connected through a crew nut and a nut housing. A lower end of the shock absorber 22 is rotatably connected to an arm portion 23 which is integrally connected to and backwardly extends from the supporting shaft 16.

With thus arranged suspension seat, the length of the shock absorber 22 is set to be long enough to increase the suspension stroke. This improves the damping property of the suspension seat 1 owing to the increase of the moving speed of the rod 22a during the impact force absorption. More particularly, since it becomes easy to change the stroke amount of the suspension seat 1 owing to the sufficient length for the suspension unit 100, it becomes easy to determine the shock absorber 22 and the compression spring 21.

Also, it becomes possible to reduce the space between the seat cushion portion 2 and the vehicular floor 4 into a necessary minimum. This increases the degree of freedom for designing. Furthermore, since almost all of the impact force is applied to the rear link 13 in the parallel link mechanism 11, only the rear link 13 may be reinforced in structural strength.

More particularly, since the rear link support bearing 15 for supporting the supporting shaft 16 of the rear link 13 is made of elastic material and projected outwardly so as to contact with the seatback pipe-frame 18, it becomes possible to use it as a bumper section under an impact applied condition. This solves a problem that a striking noise between the frames is generated during the operation of the suspension seat 1.

Figure 6:
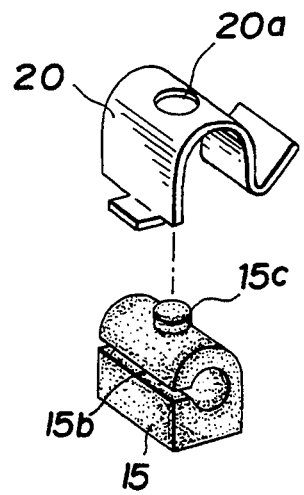
FIG. 6 is an exploded perspective view of another bearing and bracket which are applied to the first embodiment of the present invention.
Figure 7:
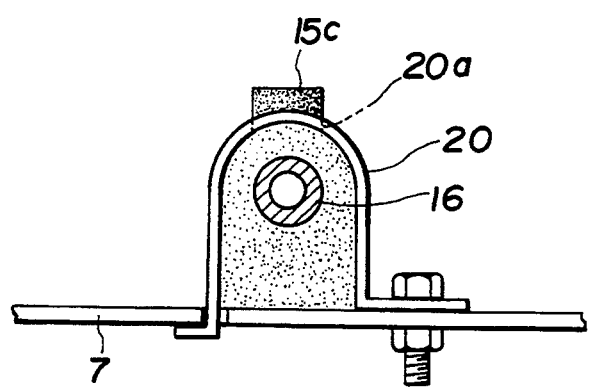
FIG. 7 is a side view of the bearing and bracket of FIG. 6 under an assembled condition.
Figure 8:
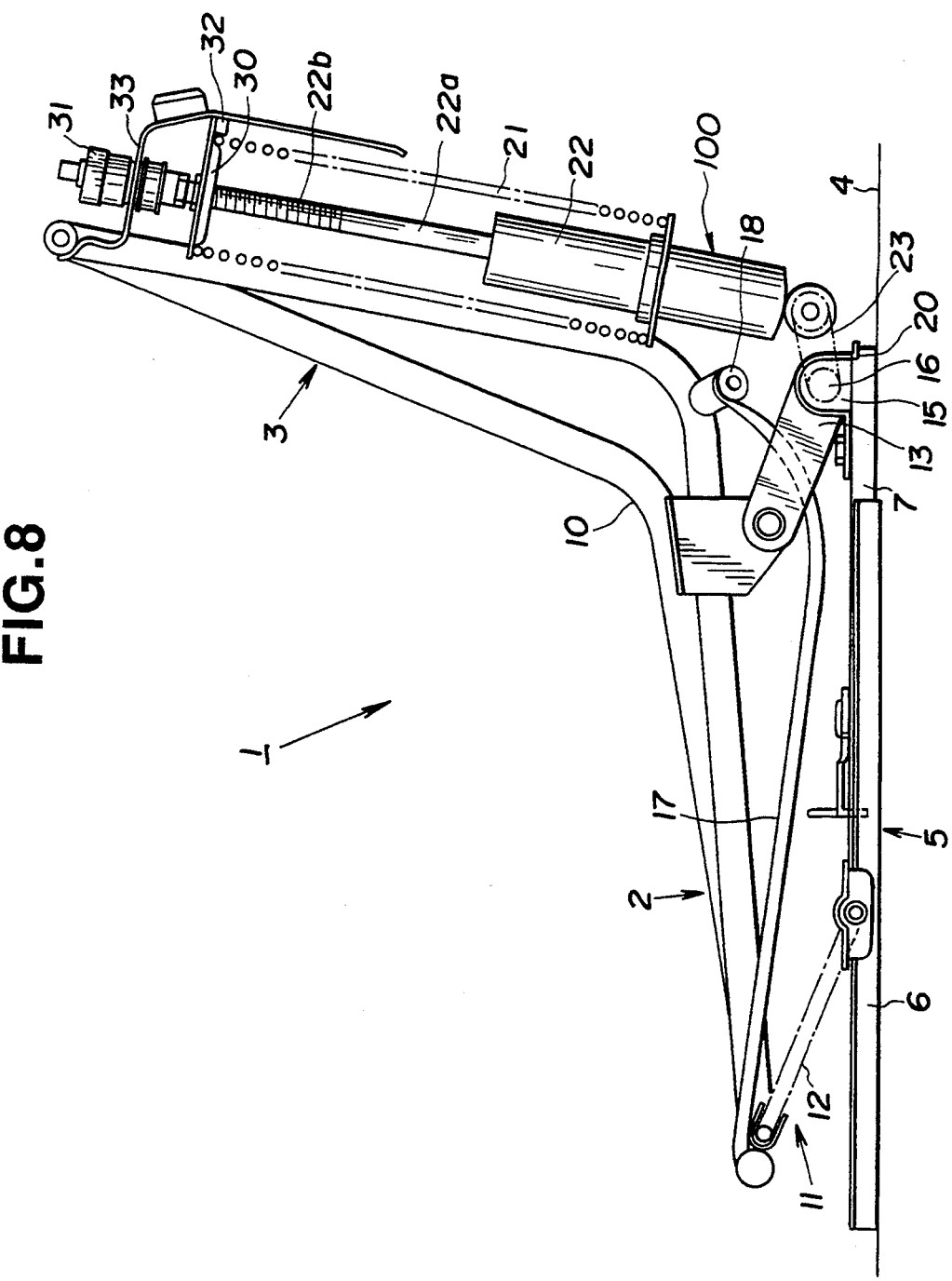
FIG. 8 is a side view of a second embodiment of the suspension seat according to the present invention.

Although the rear link support bearings 15 have been shown and described to have projections 15a functioning as a bumper, it will be understood that the rear link support bracket 15 may have a projection 15c which upwardly projects as shown in FIGS. 6 and 7.

While the present invention has been shown and described with reference to preferred embodiments thereof, it will be understood by those skilled art in the art that the foregoing and other changes in form and details can be made therein without departing from the spirit and scope of the present invention. For example, although the pipe frame 18 of the seat frame 10 is resiliently supported by the rear link support bearings 15 made of elastic material in the preferred embodiment according to the present invention, it will be noted that a proper portion of the seat frame 10 may be elastically supported without being limited by the disclosed structure by the embodiment.

Referring to FIGS. 8 to 12B, there is shown a second embodiment of the suspension seat 1 according to the present invention.

Figure 9:
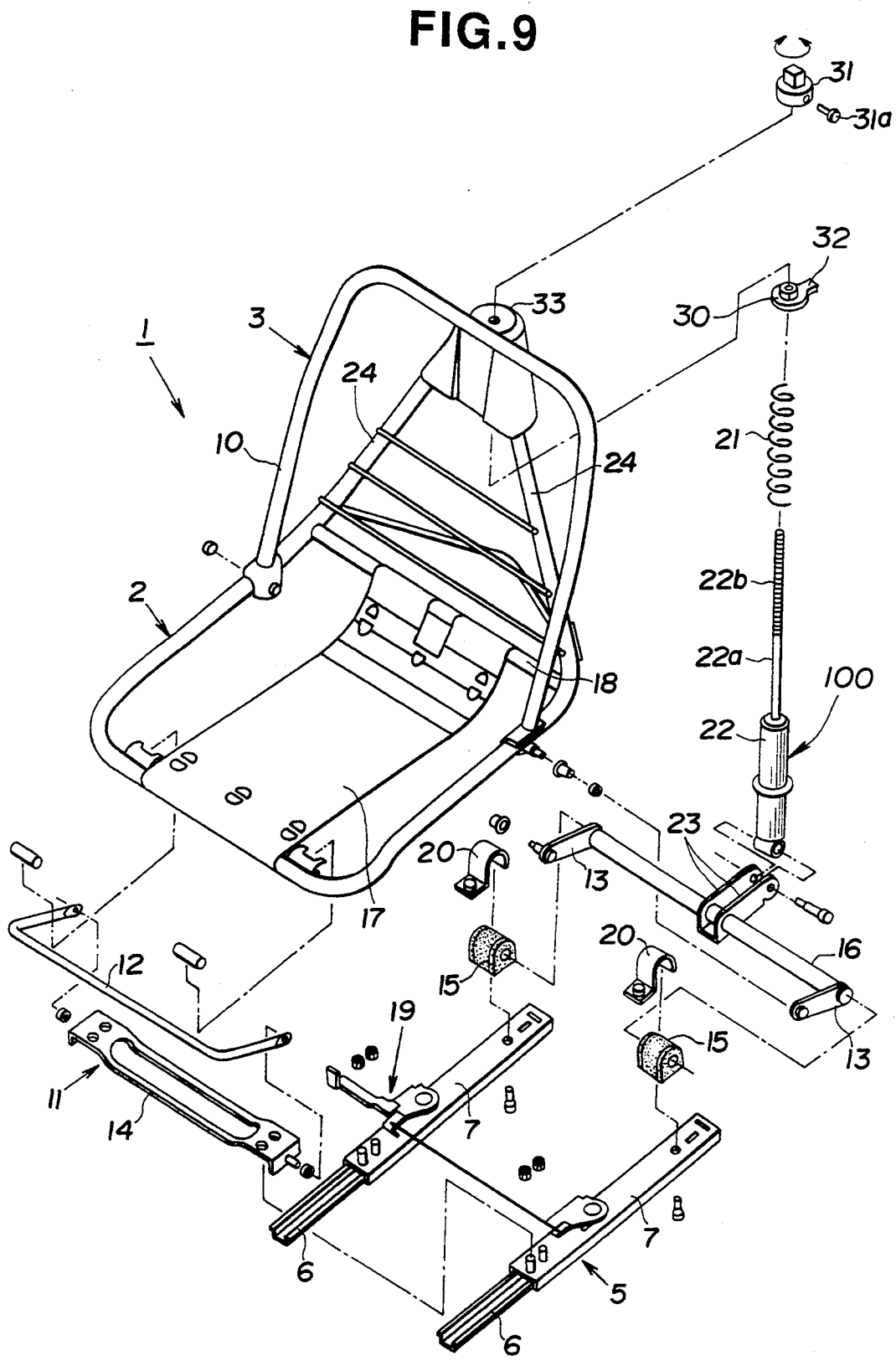
FIG. 9 is an exploded perspective view of the second embodiment of FIG. 8.
Figure 10A:
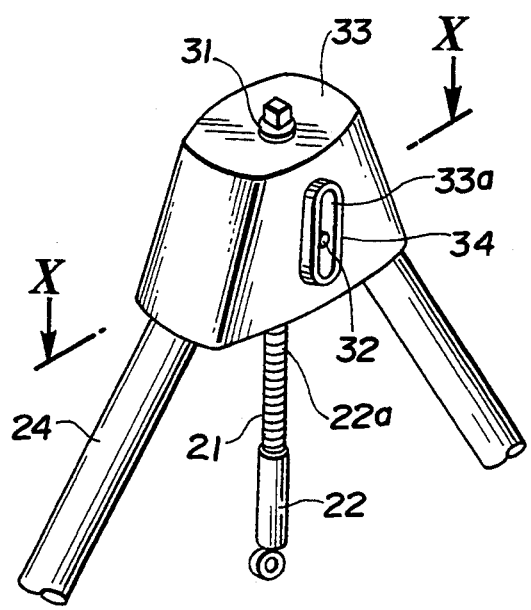
FIG. 10A is an enlarged fragmentary perspective view of the second embodiment as viewed from backward.
Figure 10B:
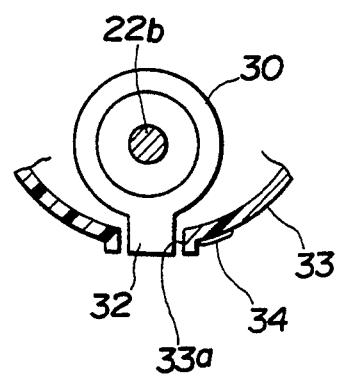
FIG. 10B is a cross-sectional view of FIG. 10A taken in the direction of arrows substantially along the line X—X of FIG. 10A.

The second embodiment of the suspension seat 1 is generally similar to the first embodiment except to the suspension unit 100. As shown in FIG. 9, the compression spring 21, which functions as a suspension spring which always applies a biasing force upwardly to the seat frame, is coaxially assembled with the movable rod 22a of the shock absorber 22. A spring bracket 30 is disposed on the compression spring 21 and screwed with the screw portion 22b formed at an upper portion of the movable rod 22a such that the screw portion 22b penetrates the spring bracket 30. The movable rod 22a is assembled to penetrate an upper bracket 33 connected to the suspension brackets 24 and is screwed with a fixing nut 31. The fixing nut 31 is fixed to the screw portion 22b by a screw 31a. Accordingly, a position of the spring bracket 30 to be screwed relative to the screw portion 22b is changed by the rotating operation of the fixing nut 31 so as to be able to control the strength of the elastic force of the compression spring 21. Furthermore, a projecting part 32 of the spring bracket 30 is disposed to be engaged with a slit 33a of the upper bracket 33. A scale division 34 is formed on the upper bracket 33 so as to be along the slit 33a, as shown in FIGS. 10A and 10B. Accordingly, the strength of the biasing force of the compression spring 21 is adjusted with reference to the position of the projecting part 32 relative to the scale division 34, at the same time, the rotation of the spring bracket 30 is avoided by the engagement of the projecting part 32 and the slit 33a.

Figure 11:
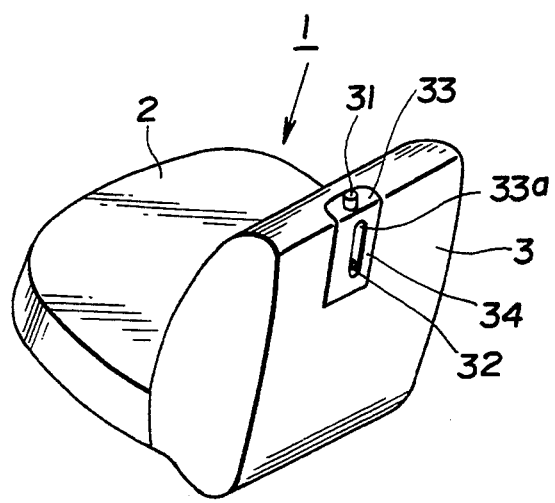
FIG. 11 is a schematic perspective view of the suspension seat according to the present invention.

As is clear from FIG. 11, the upper bracket 33 is arranged such that the scale division 34 can be seen from the backward of the suspension seat 1, and the projecting part 32 of the spring bracket 30 is arranged to point at a position of the scale division 34.

With this arrangement, the adjustment of the strength of the elastic force of the compression spring 21 is implemented in such a manner to change the position of the spring bracket 30 relative to the scale division 34 by the rotating operation of the fixing nut 31. Also, since the friction due to the biasing force of the spring becomes small as compared with a conventional system, the adjusting operation is improved. Additionally, since the upper bracket 33 is arranged so as to function as a stopper of the spring bracket 30 and as an indicator with the projecting portion 32, it becomes possible to decrease the number of parts, to improve an assembly property, and to decrease a production cost.

Although the second embodiment according to the present invention has been shown and described such that the fixing nut 31 is fixed to the screw portion 22b of the movable rod 22a, it will be understood that a lever for operation may be connected to the fixing nut 31 for facilitating the rotating operation of the fixing nut 31 and that a washer, a bearing, a plastic bush and the like may be disposed to both upper and lower sides of the bracket 30.

Figure 12A:
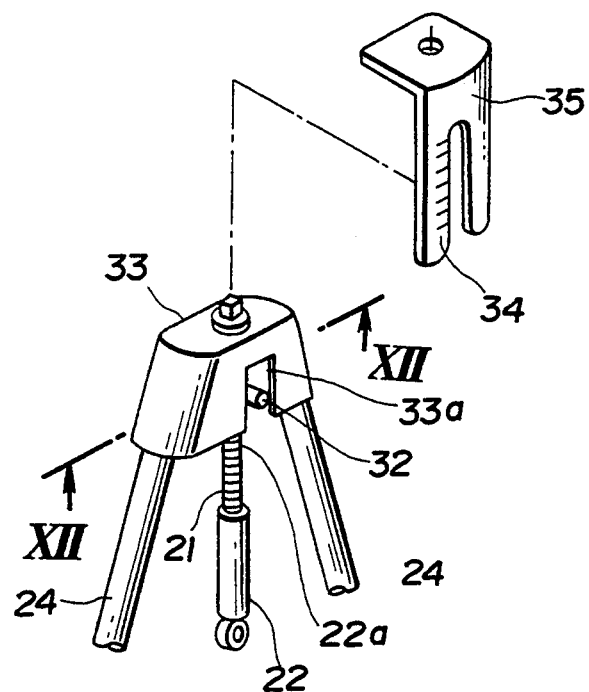
FIG. 12A is an enlarged fragmentary perspective view of another upper bracket of the suspension seat as viewed from backward.
Figure 12B:
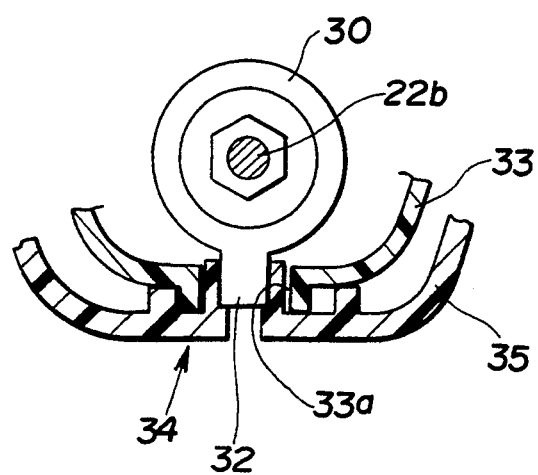
FIG. 12B is a cross-sectional view of FIG. 12A taken in the direction of arrows substantially along the line XII—XII of FIG. 12A.

Furthermore, as shown in FIGS. 12A and 12B, a cover member 35 with the scale division 34 may be independently formed from and be assembled to the upper bracket 33.

Obviously many modifications and variations of the present invention are possible in the light of the above teachings. For example, although the shock absorber 22 has been shown and described to be disposed between the rear link 13 and the upper portion of the seat back portion 3 in the preferred embodiments, it will be understood that the shock absorber 22 may be disposed between the suspension seat 1 and the vehicular floor 4. Furthermore, it will be noted that the shock absorber 22 may be installed in reverse.

Although the suspension seat 1 according to the invention is effectively applied to construction vehicles and normal vehicles, it will be noted that the suspension seat 1 may applied to others.

What is claimed is:

1. A suspension seat for an automotive vehicle comprising:
    a seat frame;
    a parallel link mechanism supporting said seat frame to be vertically movable above a vehicular floor, said parallel link mechanism including front and rear links;
    a suspension unit connected to an upper bracket integral with said seat frame and to the rear link, said suspension unit including a compression spring and a shock absorber which are coaxially arranged so as to extend in a generally vertical direction; and
    a bearing made of resilient material rotatably supporting the rear link on the vehicular floor, said bearing having an outwardly and upwardly projecting portion which directly receives a part of the seat frame when the suspension seat is downwardly moved due to an impact force applied thereto.

2. A suspension seat as claimed in claim 1, wherein said bearing is connected to a seat slide mechanism of the vehicle floor through a bracket.

3. A suspension seat as claimed in claim 1, wherein the shock absorber includes a rod having an upper portion which forms a screw portion.

4. A suspension seat as claimed in claim 3, wherein said suspension unit includes a spring bracket which receives the compression spring and is screwed to the screw portion and a fixing nut which is movably mounted to the screw portion so as to change the biasing force of the compression spring by the rotation of the fixing nut.

5. A suspension seat as claimed in claim 4, wherein an upper end of the screw portion of the rod is penetratingly assembled with the upper bracket and connected with the fixing nut, the spring bracket having a projection which projects from a slit of the upper bracket, said upper bracket having scale division.

* * * * *